United States Patent [19]
Bauer

[11] Patent Number: 6,000,091
[45] Date of Patent: Dec. 14, 1999

[54] LIGHT ABSORBING/BLOCKING ICE SCRAPER

[76] Inventor: Jeffery M. Bauer, 222 Thomson La., Oregon, Wis. 53575

[21] Appl. No.: 08/995,638

[22] Filed: Dec. 22, 1997

Related U.S. Application Data

[60] Provisional application No. 60/033,823, Dec. 23, 1996.

[51] Int. Cl.⁶ .................................................... A47L 13/08
[52] U.S. Cl. ...................... 15/236.02; 296/97.1; D32/46
[58] Field of Search ........................... 15/236.01, 236.02, 15/236.05, 236.08; 296/97.1, 97.2, 97.7, 97.9; D32/40, 46, 49

[56] References Cited

U.S. PATENT DOCUMENTS

| | | |
|---|---|---|
| 4,560,251 | 12/1985 | Mürjahn . |
| 4,746,162 | 5/1988 | Maness . |
| 4,818,011 | 4/1989 | Cherian . |
| 4,921,296 | 5/1990 | Gruber . |
| 4,943,103 | 7/1990 | Rosen . |
| 4,978,159 | 12/1990 | Landford . |
| 5,022,701 | 6/1991 | Thompson, III . |
| 5,089,912 | 2/1992 | Simin . |
| 5,247,391 | 9/1993 | Gormley . |

*Primary Examiner*—Terrence R. Till
*Attorney, Agent, or Firm*—DeWitt Ross & Stevens S.C.

[57] ABSTRACT

An ice scraper for use in removing ice from vehicle windows is disclosed which includes a partially transparent, darkly-tinted body having a tapered distal scraping end. The distal scraping end may be inserted between a vehicle window and its molding to provide a shade or sunscreen for blocking bright light from a driver's eyes. Additionally, the dark tint of the body of the ice scraper helps the body absorb thermal radiation to maintain the body at higher-than-ambient temperatures. When the tapered distal scraping end of the scraper is run over an ice-covered surface, this thermal energy combines with the mechanical removal of ice to more effectively remove ice from the surface.

18 Claims, 1 Drawing Sheet

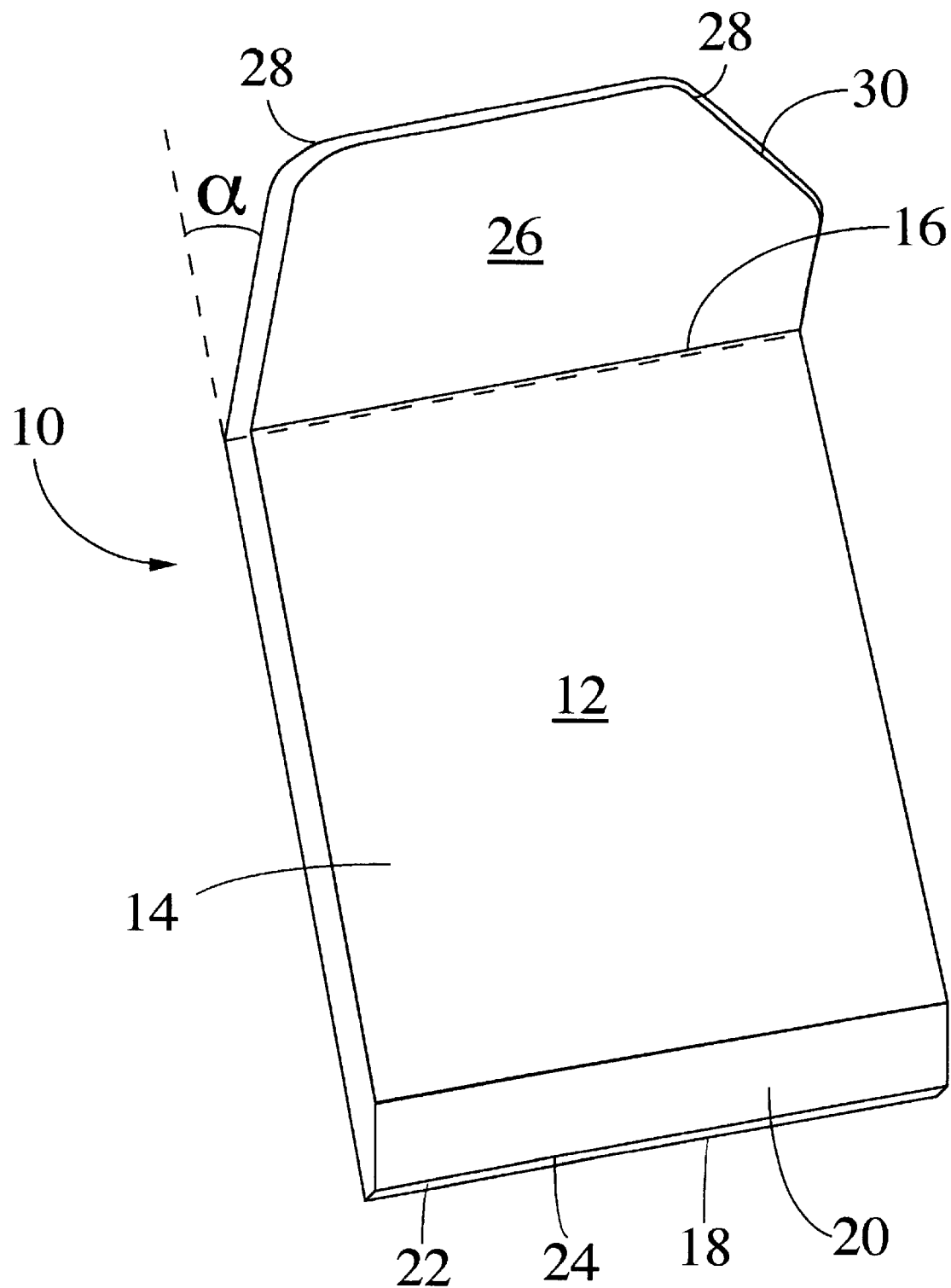
THE FIGURE

LIGHT ABSORBING/BLOCKING ICE SCRAPER

This application claims priority under 35 USC §119(e) to U.S. Provisional patent application Ser. No. 60/033,823 filed Dec. 23, 1996, the entirety of which is incorporated by reference herein.

FIELD OF THE INVENTION

The invention relates generally to apparata for removing ice, and more specifically to hand-held ice scrapers suitable for removing ice from automotive windows and windshields.

DESCRIPTION OF THE PRIOR ART

In areas having colder climates, it is common for drivers to carry hand-held ice scrapers in their vehicles so that the windows of the vehicles may be cleared of frost and snow. Such ice scrapers generally have an elongated rodlike handle terminating in a wedge-shaped distal scraping end. The tip of the distal end has a sharp chisel-pointed edge to enhance the user's ability to scrape ice from windshields. The tip is generally made of clear acrylic, this being the material of choice owing to its strength, its low cost and also because it allows the user to see the surface that has just been scraped through the distal end of the scraper.

The ice scrapers of the prior art are generally only useful for mechanically scraping ice off of windows and windshields, and thus they have no utility in warmer months or climates. They also tend to be rather easily broken because they are designed and manufactured to be cheaply replaced. As a result, the chisel-shaped distal ends tend to wear out and chip after a short period of use, thereafter making it more difficult and time-consuming to clear windshields.

SUMMARY OF THE INVENTION

The present invention is directed to an ice scraper which is designed to assist in the removal of ice by thermal means as well as mechanical means; which is designed to have added utility by affixing the scraper to a window to serve as a shade; and which is designed for greater durability than the ice scrapers of the prior art. The scraper includes a body having a top face, a bottom face, a proximal handle end, and a distal scraping end. The distal scraping end includes an affixment means for attaching the body to a window frame (e.g., an automotive window frame). The affixment means is provided in the form of an inclined face located between the top and bottom faces, thereby defining a tapering distal scraping end. Apart from allowing removable insertion of the distal end of the body into a window frame, as by inserting the distal end between a window and its molding, the tapered distal end defined by the inclined face is well suited for scraping ice off of windows. To enhance the durability of the tapered distal end and protect it from chipping, a land may be provided between the inclined face and the top face of the body. This land is preferably about 0.75 mm or more in thickness, and its surface is preferably aligned approximately perpendicular to the top face.

The body is preferably darkly tinted, e.g., with a grayish or black color, so that it has higher solar absorptivity. Thus, when the scraper is left in the sunlight (e.g., on the dashboard of a car on a sunny winter day), it will absorb sunlight and heat from its surrounding environment and its temperature will increase. When the scraper is removed from the vehicle to scrape the windows outside, this increased temperature allows the scraper to assist in ice removal by both thermal and mechanical means.

The body is also preferably partially translucent to allow users to see through the body provided sufficient light is present. Therefore, during scraping, the user can see the surface that was just scraped through the body of the scraper. Additionally, when the body is attached to a window frame by use of the affixment means, this allows the body to serve as a filter to decrease the level of light coming through the window. As an example, during the day, the body may be inserted into the window frame at such a location that the user's eyes are shielded from the sun. As another example, during the night, the body may be placed into the window frame adjacent the vehicle's driver-side mirror to decrease the level reflected light from following vehicles. Because this feature of the scraper is useful even when there is no snow or frost, the scraper has utility during warmer months and in warmer climates.

The body of the scraper is preferably square or rectangular and generally planar, with a length of at least 15 cm from the proximal end to the distal end and also a width of at least 15 cm. This size and configuration enhances the user's ability to remove large quantities of ice in a single pass, and it additionally allows the scraper to work well as a shade or sunscreen. The body generally has a thickness sufficient to allow it to be inserted between an automobile window and the window molding, as noted above, and also to allow the body a sufficient degree of flexibility so that it can be bent to conform to the slight curvature present on some automotive windows.

The scraper may further include a handle attached to the body at the proximal handle end. To assist the user in more easily removing ice from windows, the handle is preferably oriented at an acute angle with respect to the plane of the top face of the body.

Further advantages, features, and objects of the invention will be apparent from the following detailed description of the invention in conjunction with the associated drawings.

BRIEF DESCRIPTION OF THE DRAWINGS

The FIGURE is a bottom perspective view of the ice scraper of the present invention.

DETAILED DESCRIPTION OF THE INVENTION

In the FIGURE of the drawings, a preferred embodiment of the ice scraper is illustrated at the reference numeral 10. The ice scraper has a body 12 including a top face (not shown), a bottom face 14, a proximal handle end 16, and a distal scraping end 18. The distal scraping end 18 includes an inclined face 20 oriented at an acute angle to the plane of the bottom face 14, preferably at an angle of 25–30 degrees. The inclined face 20 therefore defines a pointed edge 22 between the inclined face 20 and the top face so that a user grasping the handle end 16 may run the pointed edge 22 over an ice-covered surface, scraping the ice therefrom. The inclined face 20 also defines an affixment means for affixing the body 12 to a window frame, as by inserting the inclined face 20 between a vehicle window and its molding.

To impart greater durability to the pointed edge 22 and prevent it from chipping during use when scraping ice, the distal scraping end 18 preferably includes a land 24 between the inclined face 20 and the top face. This land 24, which is preferably perpendicular to the top face and which preferably has a thickness of about 0.75 millimeters or more, ensures that the pointed edge 22 does not have such a thin profile that it is subject to easy chipping when it is used to remove ice from a surface.

The body 12 of the ice scraper 10 is preferably made of a darkly-tinted acrylic material, though other durable materials may be used instead. A dark gray or black tint is preferred for use in the body 12 so that it will absorb a significant amount of ambient heat and light to maintain the body 12 at a generally higher temperature than the environment. For example, on a sunny winter day when the ice scraper 10 is resting on the dashboard of a car with the sunlight incident on the ice scraper 10 through the car windows, the ice scraper 10 may adopt a temperature 10–15 degrees higher than the temperature of the windshield. This helps the ice scraper 10 to better remove ice from the windshield, particularly when the ambient temperature is near the freezing point.

However, it is also preferred that the material used for the body 12 of the ice scraper 10 be at least partially translucent, and that the tinting of the body 12 not be so dark that the body 12 becomes effectively opaque. This allows a user to affix the ice scraper 10 to a window frame by use of the affixment means (i.e., by inserting the inclined face 20 of the distal scraping end 18 between a vehicle window and its molding) at a desired location around a vehicle window to provide a filter or sunscreen, as opposed to an opaque shade which transmits no light. As an example, during the day, the ice scraper 10 can be mounted on a vehicle's side window to shield the driver's eyes from sunlight shining therein. As another example, at night the user may affix the ice scraper 10 to a vehicle's side window at a point such that the user's eyes are shielded from bright lights shining in the mirrors mounted at the side of the car. Because these advantageous features of the ice scraper 10 are useful even when no ice is present, the ice scraper 10 provides utility in any climate and at any time of the year.

A better understanding of the thermal and optical properties of the ice scraper 10, as well as possible modifications for use in alternate embodiments of the ice scraper 10, may be understood by resorting to the second law of thermodynamics. Solar radiation with a total intensity $I_t$ falling on a translucent material may be expressed in terms of three components: the solar energy transmitted $q_T$, the solar energy absorbed $q_A$, and the solar energy reflected $q_R$. These quantities depend on three material properties of the translucent material: the transmissivity $\tau$ of the material, the absorptivity $\alpha$ of the material, and the reflectivity $p$ of the material. The radiation intensity $I_t$ can thus be expressed algebraically as:

$$I_t = q_T + q_A + q_R = I_t(\tau + \alpha + p)$$

Naturally, the sum of the properties $\tau$, $\alpha$, and $p$ must equal unity, and thus an increase in one requires a decrease in the others. The individual values of $\tau$, $\alpha$, and $p$ depend on the incident angle and wavelength of the radiation, the composition of the material, and the nature of the surface of the material. In general, the absorptivity $\alpha$ may be increased by adding a darker tint to the material, by roughening the surface of the material, or by choosing an appropriate surface coating. Since high absorptivity $\alpha$ is desired, a darker tint is chosen for the material of the body 12, but preferably not so dark that transmissivity $\tau$ (i.e., visibility through the body 12) is forfeit. Surface roughening or coating could be used to increase the absorptivity $\alpha$, but these are not believed to be worth the further decrease in transmissivity $\tau$ and the manufacturing and/or material costs involved. Therefore, while surface coatings or roughening are options to consider to increase solar heating of the ice scraper 10, they are not preferred.

As illustrated in the Figure, the ice scraper 10 preferably includes a handle portion 26 oriented at an angle to the body 12. It has been found that for ease of use, the handle portion 26 should be oriented at an acute angle to the plane of the top face (i.e., the face of the body 12 which does not include the inclined face 20), preferably of approximately 15 degrees. The handle 26 preferably includes rounded corners 28 to prevent the possibility of cuts or scratches to the user's hand when the ice scraper 10 is being used to vigorously scrape ice from a vehicle's windows. Further, the handle 26 preferably has one (or both) sides oriented at an angle with respect to the corresponding side of the body 12, as illustrated at 30. This is beneficial where the ice scraper 10 is affixed to a vehicle window, as by inserting the distal scraping end 18 between a driver- or passenger-side vehicle window and its molding, in that the angled side 30 may closely fit against the molding where the vehicle window has a trapezoidal or other non-rectangular shape.

The ice scraper 10 has certain preferred dimensions. It is preferred that the distal scraping end 18 and pointed edge 22 have a width of about 15 centimeters or more to allow the user to remove greater quantities of ice when the pointed edge 22 is run across a vehicle window. This size also permits the scraper to be useful as a mini-shovel, for example, when small amounts of ice and snow need to be removed from a tire's path for better traction. It is also preferred that the proximal handle end 16 has a width of about 15 centimeters or more, and a length from the body 12 of approximately 5 cm or more, to provide a larger grasping surface. The length of the body 12, i.e., the distance between the pointed edge 22 and the handle portion 26, should be chosen to have a size sufficient that the body 12 will form a sunscreen of large area when the ice scraper 10 is in use as a shade, and therefore a greater length is preferred; however, at the same time the body 12 should not be so long that the user has poor leverage at the distal end 18 when grasping the ice scraper 10 at its handle portion 26, or else the ice scraper 10 will become unwieldy for its primary use. It has been found that a body 12 having a length of approximately 15 centimeters or slightly more functions quite well. The body 12 and handle 26 preferably have a thickness of approximately 0.32 cm to allow the body 12 to better fit between a vehicle window and its molding. This thickness also allows the body 12 sufficient flexibility that it can be bent to conform to the slight curvature present on some vehicle windows, thereby enhancing the effective scraping area achieved by the pointed edge 22 during each pass while scraping.

It is understood that preferred embodiments of the invention have been described above in order to illustrate how to make and use the invention. The invention is not intended to be limited to these embodiments, and is intended to encompass all alternate embodiments that fall literally or equivalently within the scope of the claims set out below. It is understood that in these claims, means plus function clauses are intended to encompass the structures described above as performing their recited function, and also both structural equivalents and equivalent structures. As an example, though a nail and a screw may not be structural equivalents insofar as a nail employs a cylindrical surface to secure parts together whereas a screw employs a helical surface, in the context of fastening parts, a nail and a screw are equivalent structures.

What is claimed is:

1. A scraper comprising:
   a. a partially translucent darkly-tinted body having a top face, a bottom face, a proximal handle end, and a distal scraping end, the proximal and distal ends each being at least about 15 cm wide and being spaced at least about 15 cm apart; and
   b. affixment means for affixing the body to a window frame, the affixment means being located at the distal end of the body,
      wherein the affixment means comprise an inclined face located between the top and bottom faces at the distal end, and
      wherein the affixment means further comprise a distal land located between the inclined face and the top face.

2. A. The scraper of claim 1 wherein the distal land is at least about 0.75 mm thick.

3. The scraper of claim 1 wherein the surface of the distal land is aligned generally perpendicular to the top face of the body.

4. The scraper of claim 1 wherein the body is generally planar, and wherein the scraper further comprises a handle oriented at an angle to the body, this angle being acute with respect to the plane of the top face.

5. The scraper of claim 4 wherein the handle includes rounded corners.

6. The scraper of claim 1 wherein the top face is generally rectangular.

7. A scraper comprising a partially translucent darkly-tinted body having a top face, an opposing bottom face, a proximal end, and a tapered distal end,
   wherein the proximal and distal ends are each at least 15 cm wide and are spaced at least about 15 cm apart,
   the tapered distal end including an inclined face and a distal land, wherein the inclined face is located adjacent the bottom face and the distal land is located between the inclined face and the top face.

8. The scraper of claim 7 wherein the body is generally planar, and wherein the scraper further comprises a handle oriented at an angle to the body, the angle being acute with respect to the plane of the top face.

9. The scraper of claim 7 wherein the distal land is at least about 0.75 mm thick.

10. The scraper of claim 7 wherein the surface of the distal land is aligned generally perpendicular to the top face of the body.

11. The scraper of claim 7 wherein the body is generally planar, and wherein the scraper further comprises a handle oriented at an angle to the body, this angle being acute with respect to the plane of the top face.

12. The scraper of claim 11 wherein the handle includes rounded corners.

13. A scraper comprising:
    a. a partially translucent darkly-tinted generally planar body having a top face, a bottom face, a proximal handle end, and a distal scraping end, the proximal and distal ends each being at least about 15 cm wide and being spaced at least about 15 cm apart;
    b. affixment means located at the distal end of the body for affixing the body to a window frame, the affixment means comprising an inclined face located between the top and bottom faces at the distal end; and
    c. a handle oriented at an angle to the body, this angle being acute with respect to the plane of the top face.

14. The scraper of claim 13 wherein the handle includes rounded corners.

15. The scraper of claim 13 wherein the affixment means further comprise a distal land located between the inclined face and the top face.

16. The scraper of claim 15 wherein the distal land is at least about 0.75 mm thick.

17. The scraper of claim 15 wherein the surface of the distal land is aligned generally perpendicular to the top face of the body.

18. The scraper of claim 13 wherein the top face is generally rectangular.

* * * * *